UNITED STATES PATENT OFFICE.

SWIGEL POSTERNAK, OF CHÊNE-BOUGERIES, NEAR GENEVA, SWITZERLAND, ASSIGNOR TO SOCIETY OF CHEMICAL INDUSTRY IN BASLE, OF BASEL, SWITZERLAND.

ORGANIC PHOSPHORUS COMPOUND FROM PLANTS.

1,313,014. Specification of Letters Patent. Patented Aug. 12, 1919.

No Drawing. Application filed July 12, 1918. Serial No. 244,645.

*To all whom it may concern:*

Be it known that I, SWIGEL POSTERNAK, chemist, a citizen of Russia, residing at Chêne-Bougeries, near Geneva, in the Confederation of Switzerland, have invented certain new and useful Improvements in Organic Phosphorus Compound from Plants, of which the following is a specification.

Searches have been long ago made for finding a technical method of preparation of chemically pure salts of the organic phosphorus-reserve-compound of the green plants, but these searches meet with great difficulties. The said body possesses the tendency of forming mixed salts so that the bases which are contained in the natural product can not be wholly replaced by a new one. neither by means of heavy metal salts and oxids nor with salts and oxids of alkaline earths and alkali-metals. One succeeds however in attaining this object by a complicated and expensive method as for instance the one described in the French additional Patent No. 2669. But the organic compound is partially decomposed while the acid solution is evaporated and, as this has been stated since, it is not wholly free from organic impurities.

Better results with regard to the purity of the compounds have been obtained by R. J. Anderson (*Journal of Biological Chemistry*, Vol. XVII, No. 2, March 1914), in preparing and several times recrystallizing an acid barium salt of the compound. This process however is not suitable for techincal purposes giving only small yields.

Only the discovery of the present process has removed all technical difficulties. This process permits an easy transformation of all the salt mixtures of the organic phosphorus reserve compound of the green plants into a new crystallized, chemically pure salt which is soluble in water, and the preparation from the same, by double decomposition or by precipitation, with different salts and oxids, of uniform and chemically pure salts.

The new salt obtained by this process has hitherto never been described. It forms nicely developed prisms. Its composition corresponds to the formula

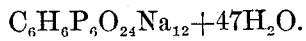

$$C_6H_6P_6O_{24}Na_{12} + 47H_2O.$$

It melts in its water of crystallization below 46° C. The crystals effloresce, that is, lose part of their water of crystallization, through being exposed to the air. The salt after having been freed from the water of crystallization forms a snow-white, stable, non-deliquescent powder which is clearly soluble in water, acts like an alkali upon litmus and phenolphthalein and possesses a decided taste of soda. This salt is not soluble in alcohol and other organic solvents.

The new process may for instance be carried out in the following manner:

10 kilograms of any soluble or insoluble salt mixture of the phosphorus reserve compound or of an impure phosphorus compound free of bases are dissolved into 100 to 200 liters of ordinary water by means of an excess of diluted hydrochloric acid. To the such obtained solution is added a solution of about 7.5 kilos of ferric chlorid ($FeCl_3$) as long as a precipitation is obtained. The iron precipitate is filtered and washed first with slightly acidulated and last with distilled water, whereafter it is suspended in about 20 liters water and mixed with a solution of 7.5 kilos caustic soda. The mixture is shaken until all iron salt is decomposed, this requiring about an hour or so. The hydroxid of iron is filtered, and alcohol is added to the filtered liquor in the proportion of a third of its volume, the mixture is thoroughly stirred and then it is left at rest for crystallization.

After several hours the sodium salt crystallizes. The diluted alcohol is decanted, the crystalline mass is triturated and thrown off in a centrifugal device. This salt is recrystallized from water in order to be obtained in a quite pure state. The hydrochloric acid employed in this example may be replaced by another mineral acid as for instance hydrobromic or nitric acid; the iron-chlorid may also be replaced by another ferric salt as for instance ferric nitrate or sulfate. The aqueous solution of this salt yields by double decomposition with soluble calcium, magnesium, strontium and barium salts insoluble precipitates of the saturated pure and uniform salts of the phosphorus compound which, by means of suitable acids such as for instance oxalic, sulfuric and other acids, may be wholly or partially separated from the bases and may serve for preparing the free organic phosphorus compound or its acid salts.

The aqueous solution of the new salt may be converted by a double decomposition by means of a soluble copper, lead or other salt into a corresponding metallic salt. This salt, after being washed and freed from metal by means of hydrogen sulfid, yields a solution of the chemically pure acid of the phosphorus compound. This acid may be partially or wholly saturated with organic or inorganic bases of any kind in order to prepare acid, neutral or alkaline definite salts of the said compound.

The solution of the crystallized sodium-salt yields with soluble manganese and iron salts insoluble pure manganese or iron salts. The ferric salts which are insoluble in acids are transformed by means of reducing agents into ferrous salts which are soluble in acids.

Having thus fully described the nature of my invention, I claim:—

1. The herein described process of preparing a chemically pure and uniform salt of the organic phosphorus reserve compound of the green plants, consisting in dissolving the impure organic phosphorus reserve compound of the green plants with diluted mineral acid, precipitating the phosphorus compound by means of a solution of ferric salt, decomposing the washed iron precipitate by an excess of caustic soda, filtering, adding diluted alcohol to the filtrate, effecting crystallization, and then recrystallizing the crystalline mass in water in order to obtain the chemically pure sodium salt, the aqueous solution of which is capable of being transformed wholly or partially into chemically pure and uniform acid, neutral or alkaline salts by usual methods.

2. The herein described process of preparing a chemically pure and uniform salt of the organic phosphorus reserve compound of the green plants, consisting in dissolving the impure organic phosphorus reserve compound of the green plants with diluted hydrochloric acid, precipitating the organic phosphorus compound by means of a ferric salt, and decomposing the iron precipitate by an excess of caustic soda.

3. The herein described process of preparing a chemically pure and uniform salt of the organic phosphorus reserve compound of the green plants, consisting in dissolving the impure organic phosphorus reserve compound of the green plants with diluted hydrochloric acid, precipitating the organic phosphorus compound by means of a solution of ferric chlorid and decomposing the iron precipitate by an excess of caustic soda.

4. As a new product prepared by means of the herein described process the sodium salt having the formula $C_6H_6P_6O_{24}Na_{12}$ and crystallizing, from its aqueous or diluted alcoholic solutions in prisms containing 47 mol. of water of crystallization and melting below 46° C. and constituting in its anhydrous form a snow-white, stable, non-deliquescent powder, which is clearly soluble in water, insoluble in alcohol and other organic solvents.

In testimony whereof I have affixed my signature in presence of two witnesses.

SWIGEL POSTERNAK.

Witnesses:
ROD. DE WURSTEMBERG,
J. DIVORNE.